UNITED STATES PATENT OFFICE.

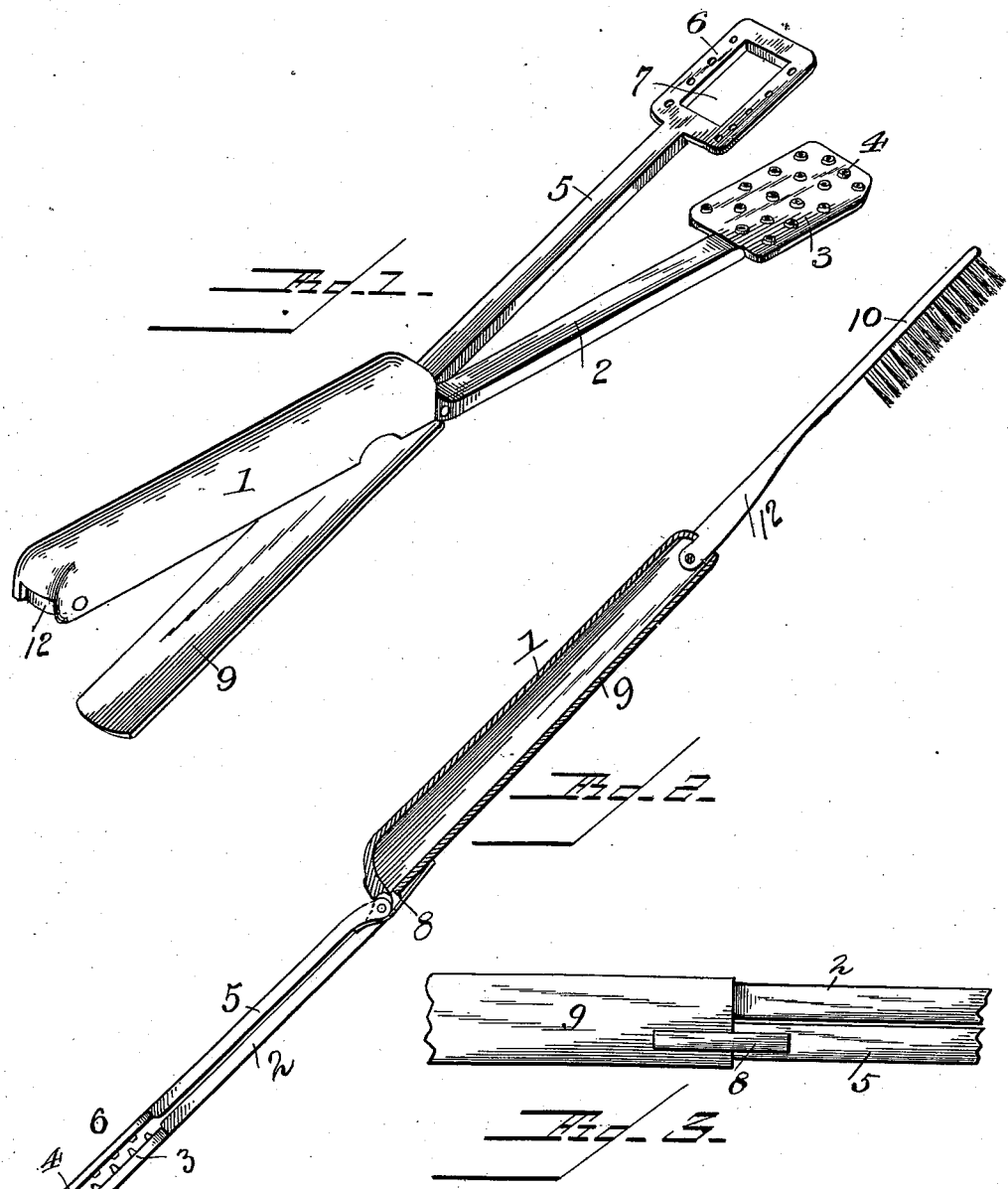

ANNIE E. ADAIR, OF ABILENE, TEXAS.

KITCHEN UTENSIL.

SPECIFICATION forming part of Letters Patent No. 540,938, dated June 11, 1895.

Application filed March 1, 1895. Serial No. 540,157. (No model.)

*To all whom it may concern:*

Be it known that I, ANNIE E. ADAIR, a citizen of the United States, and a resident of Abilene, in the county of Taylor and State of Texas, have invented certain new and useful Improvements in Kitchen Utensils; and I do hereby declare that the following is a full, clear, and exact description of the invention, which will enable others skilled in the art to which it appertains to make and use the same, reference being had to the accompanying drawings, which form a part of this specification.

My invention relates to combination kitchen utensils for washing dishes, scraping pots, and other cooking vessels, and cleaning ornamenal glass and silver ware, and it consists in the novel construction and combination of parts hereinafter fully described and claimed.

In the accompanying drawings, Figure 1 represents a perspective view of a combination cooking utensil, the clamps or tongs being opened; Fig. 2, a central longitudinal section, the clamps or tongs being closed and the brush in position for use. Fig. 3 is a detail view.

In the said drawings, the reference numeral 1 designates a hollow handle open at the top and at one end. Formed integral with or secured to the opposite or closed end of the handle is an arm 2, having at its outer end a clamping plate 3, the end of which is beveled to form a sharp or scraping edge. This plate is formed with a number of perforations 4, formed by punching, so that burrs will be formed on the side of the plate to engage with a dish-cloth. Pivoted to said closed end of the handle is a movable arm 5, provided at its outer end with a clamping plate 6, formed similar to plate 3, and also formed with a slot 7, through which a dish-rag may be passed. To enable it to be more securely held, connected with the said pivoted arm by means of a metal bar 8, preferably of spring metal, is a cover 9, for the handle 1. Located within said hollow handle is a brush 10, the handle 12, of which is pivoted to said haddle 1, near the open end of the latter. When not in use, the brush folds within the said handle, as in Fig. 1.

The manner of using this implement will be readily understood. A dish-rag is inserted between the clamping plates or passed through the slot in plate 6, as may be desired. The handle 1 and cover 9 are then grasped and forced together, clamping the dish-rag between the plates. Dishes and other articles may now be washed without putting the hands in the water, or catching hold of the dish-rag, thus not only preventing soiling the hands, but preventing injury thereto from hot water, or broken or jagged vessels. The sharp edges of the plates are used to scrape pots and other cooking vessels.

When it is desired to employ the brush, for cleaning ornamental articles of china, glass or silver-ware, the cover 9 is opened and the brush 10 turned outward, on its pivot. The cover is then closed and secured in place by a suitable catch, or other device for holding it in place.

Having thus fully described my invention, what I claim is—

1. A combination kitchen utensil, comprising the hollow handle open at one side and end, the arm secured thereto having a clamping plate with a beveled end, in combination with the pivoted arm having a clamping plate and the cover connected with said pivoted arm, substantially as described.

2. A combination kitchen article comprising the hollow handle open at one side and end, the arms secured thereto having a clamping plate with a beveled end, the pivoted arm having a clamping plate, the cover connected with said pivoted arm and the brush pivoted to said handle, substantially as described.

In testimony that I claim the foregoing as my own I have hereunto affixed my signature in presence of two witnesses.

ANNIE E. ADAIR.

Witnesses:
M. J. LONG,
R. T. HANKS.